Dec. 31, 1963
H. L. MILLER
3,116,380
CARD KEY SYSTEM
Filed Nov. 25, 1959
4 Sheets-Sheet 1
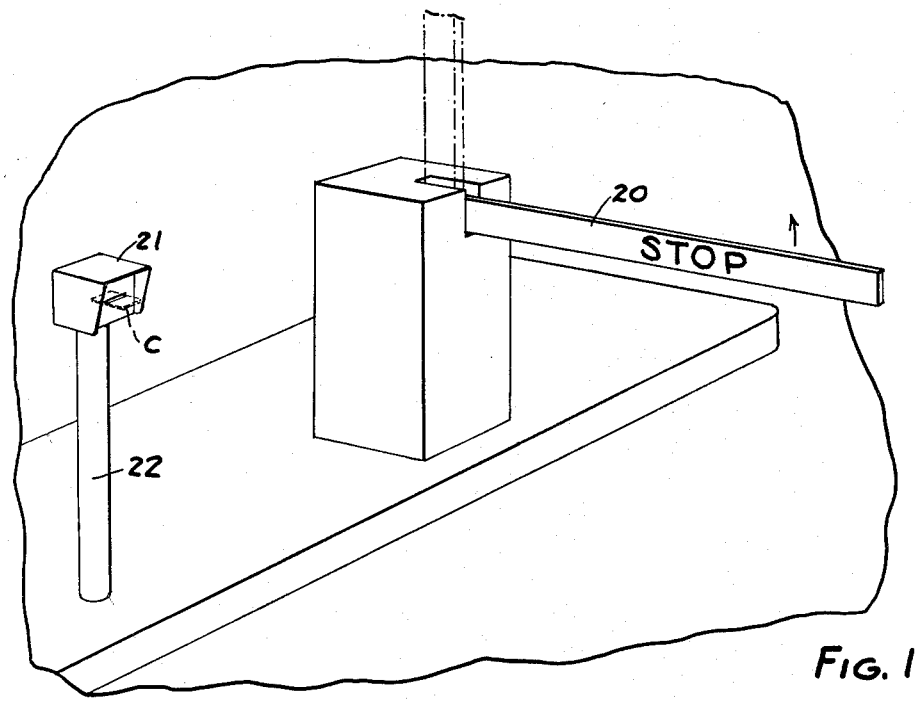
FIG. 1
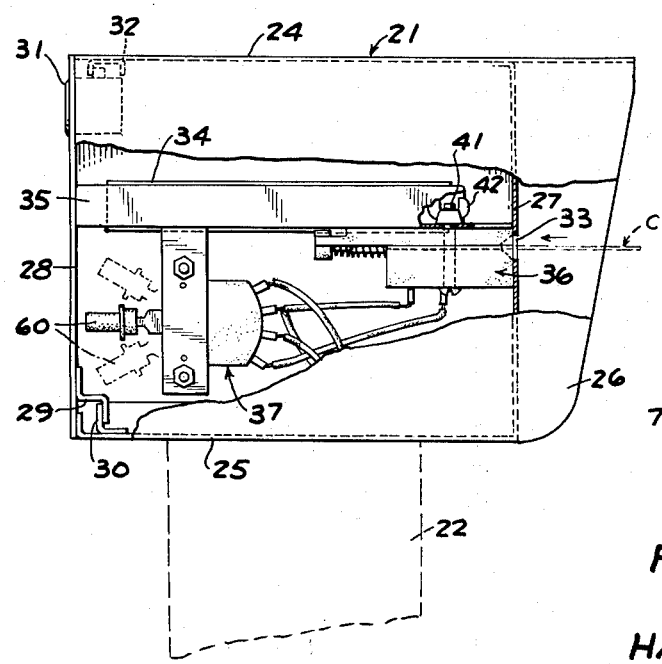
FIG. 2
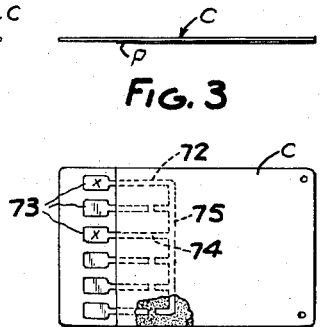
FIG. 3
FIG. 4
INVENTOR.
HAROLD L. MILLER
BY
Barnes, Kisselle, Raisch & Choate
ATTORNEYS Dec. 31, 1963   H. L. MILLER   3,116,380
CARD KEY SYSTEM
Filed Nov. 25, 1959   4 Sheets-Sheet 2

INVENTOR.
HAROLD L. MILLER
BY
Barnes, Kisselle, Raisch
& Choate
ATTORNEYS

Dec. 31, 1963     H. L. MILLER     3,116,380
CARD KEY SYSTEM
Filed Nov. 25, 1959     4 Sheets-Sheet 3
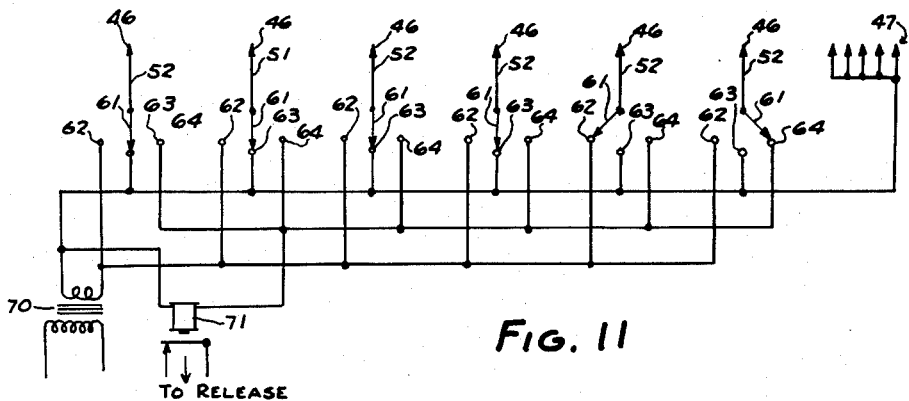
FIG. 11
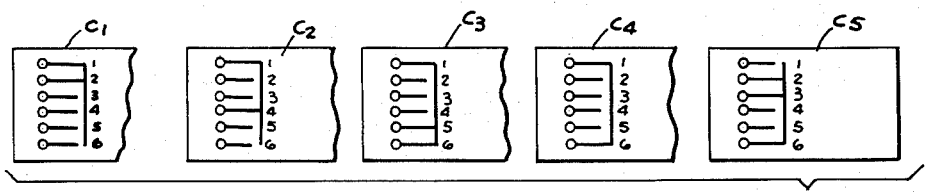
FIG. 12
| CODE NO. | SWITCH NUMBER | | | | | |
|---|---|---|---|---|---|---|
| | 1 | 2 | 3 | 4 | 5 | 6 |
| 1 | U | D | | | | |
| 2 | U | | D | | | |
| 3 | U | | | D | | |
| 4 | U | | | | D | |
| 5 | U | | | | | D |
| 6 | | U | D | | | |
| 7 | | U | | D | | |
| 8 | | U | | | D | |
| 9 | | U | | | | D |
| 10 | | | U | D | | |
| 11 | | | U | | D | |
| 12 | | | U | | | D |
| 13 | | | | U | D | |
| 14 | | | | U | | D |
| 15 | | | | | U | D |
FIG. 13
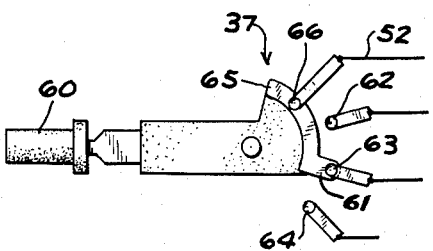
FIG. 14
INVENTOR.
HAROLD L. MILLER
BY
Barnes, Kisselle, Raisch & Choate
ATTORNEYS INVENTOR.
HAROLD L. MILLER
BY
Barnes, Kisselle, Raisch & Choate
ATTORNEYS

United States Patent Office 3,116,380
Patented Dec. 31, 1963

3,116,380
CARD KEY SYSTEM
Harold L. Miller, Detroit, Mich., assignor to Vemco Products, Inc., Detroit, Mich., a corporation of Michigan
Filed Nov. 25, 1959, Ser. No. 855,319
23 Claims. (Cl. 200—46)

This invention relates to card key systems and particularly to card key systems incorporating a card for controlling an electric circuit such as is used to actuate a gate in an automobile parking lot or door of a private club.

It has heretofore been proposed that cards be utilized to actuate an electrical circuit for opening a gate or door. For example, magnetic means are provided on the card which interact with a magnet operated switch into which the card is inserted to actuate the electrical circuit which controls the gate or door.

It is an object of this invention to provide an improved card key system.

It is a further object of the invention to provide such a system which includes electrically conductive means on the card so that when the card is inserted in the appropriate mechanism an electrical circuit is completed for actuating the gate or door.

It is a further object of the invention to provide such a system wherein the setting of the system may be changed from time to time without the use of tools in order to accommodate cards having different means thereon; thus enabling the system to be used where cards are to be renewed, from time to time, as by the payment of a new fee.

It is a further object of the invention to provide such a system which cannot be operated by the insertion of foreign means such as a knife or the like.

It is a further object of the invention to provide such a system wherein the setting can be readily changed from time to time such that the system is operable by the old type of cards which have been replaced and by the new type of cards with different electrical conductive means thereon, thereby enabling the system to provide a certain continuity to the operation thereof.

Basically, the system comprises a contact mechanism into which a card having electrically conductive means thereon is inserted, thereby completing a potential circuit between certain of the contacts of the contact mechanism and a switching assembly connected to the contacts whereby predetermined contacts may be selectively connected to the circuit to be operated. By changing the setting of the switching assembly, it is possible to change the predetermined contacts which are in the circuit for controlling the gate or door.

In the drawings:

FIG. 1 is a perspective view of the system as applied to operating a gate.

FIG. 2 is a part sectional side elevation view of the card inserting mechanism of the system.

FIG. 3 is a side elevation of the card key used in operating the system.

FIG. 4 is a plan view of the card key shown in FIG. 3.

FIG. 11 is a diagrammatic wiring diagram of the card key system.

FIG. 12 is a diagrammatic plan view of the indicia means on a plurality of card keys used in the system.

FIG. 13 is a table showing the various settings of the card key system.

FIG. 14 is a side elevation of one of the switches in the switching assembly.

Referring to FIG. 1, a card key system made in accordance with the invention may be used, for example, in operating a gate 20 by insertion of a card C into a card receiving mechanism 21 mounted on the upper end of a post 22 so that when a driver in an automobile approaches the gate 20 he merely inserts the card C into the mechanism 21 and if the card bears the proper electrically conductive means, a circuit is completed causing the mechanism for elevating the gate 20 to be operated and thereby permitting the car to drive into the restricted parking lot.

Figure 5:
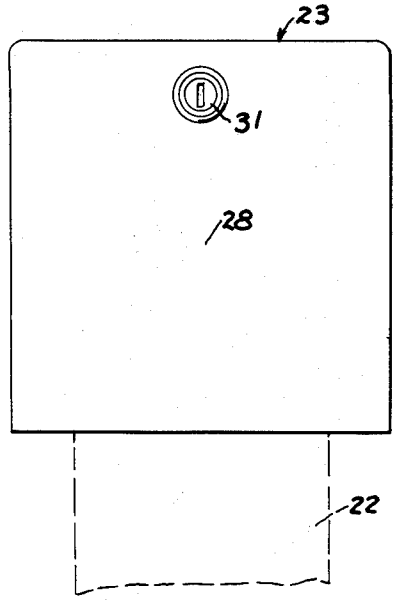
FIG. 5 is a rear elevation of a card receiving mechanism.
Figure 9:
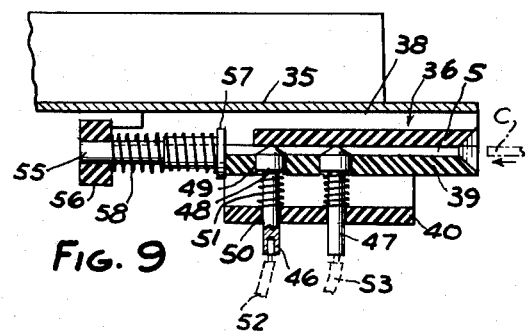
FIG. 9 is a fragmentary sectional view taken along the line 9—9 in FIG. 7.
Figure 8:
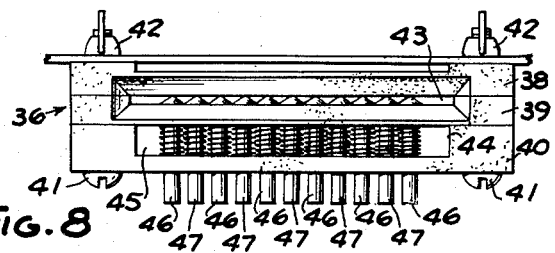
FIG. 8 is a front elevation of the contact assembly.
Figure 6:
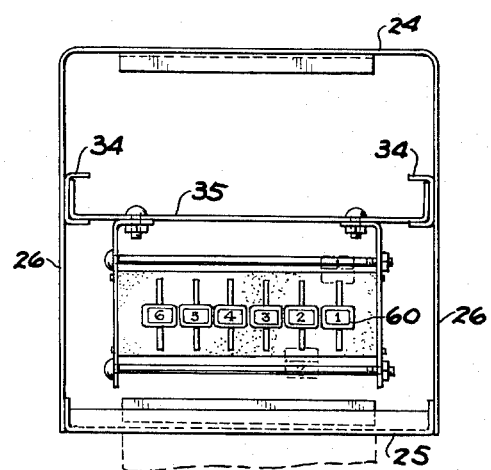
FIG. 6 is a rear elevation similar to FIG. 5 with the rear cover removed.
Figure 7:
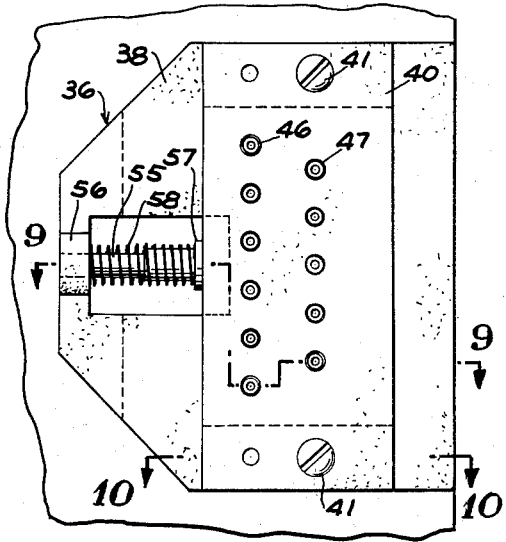
FIG. 7 is a bottom plan view of the contact assembly.

Referring to FIGS. 2, 5 and 6, card key mechanism includes a housing 23 which is generally rectangular in shape and has a top wall 24, bottom wall 25, side walls 26, front wall 27 and removable rear wall 28, the latter being provided with a flange 29 which is adapted to engage a flange 30 in the bottom wall 25. In addition, a key operated tumbler lock 31 is provided on the upper end of the rear wall 28 and is adapted to engage a channel member 32 for holding the rear wall 28 in locked position.

Front wall 27 is provided with an opening 33 through which the card C is inserted as presently described. As shown in FIGS. 1 and 2, top wall 24 and side walls 26 extend forwardly beyond the front wall 27 to provide an overhanging cover for the opening 33 protecting the opening from the elements of the weather.

As shown in FIGS. 2 and 6, channels 34 are provided on the side walls 26 and are adapted to receive slidingly a horizontal plate 35 from which a contact assembly 36 and a switching assembly 37 are suspended as presently described.

The contact assembly is adapted to receive the card having the electrical conductive means thereon and, if the latter means on the card are proper, they will complete the circuit between certain of the contacts therein. The switching assembly is electrically connected to the contact assembly and is adapted to selectively engage and determine which of the contacts are sensitized for completion of the circuit by the insertion of the card.

Figure 10:
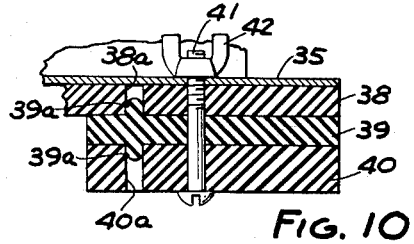
FIG. 10 is a fragmentary sectional view taken along the line 10—10 in FIG. 7.

As shown in FIGS. 7–10, the contact assembly 36 comprises an upper receiver plate 38, an intermediate receiver plate 39 and a lower receiver plate 40 clamped together and supported from the plate 35 by screws 41 extending therethrough and a wing nut 42 threaded on the screw (FIG. 10). Integral projections 39a on intermediate plate 39 extend into openings in 38a, 40a in plates 38, 40, respectively, to insure proper alignment of the plates.

Each of the receiver plates 38, 39, 40 is made of electrical insulating material such as phenolic resin. The upper surface of the intermediate receiver plate 39 is formed with a groove 43 which is of substantially the same width as the work width of the card C so that the intermediate plate 39 cooperates with the flat undersurface of the plate 38 to form a chamber or slot for receiving the card C (FIG. 6). Lower plate 40 is also formed with a groove 44 in the upper surface thereof of considerably greater depth than the groove 43 and cooperates with the underside of the intermediate plate 39 to form a space 45. Two rows of electrical contacts 46, 47 are provided in the contact assembly 36, the outer contacts 47 being staggered relative to the inner contacts 46 for purposes presently described. Each contact 46 is in the form of a pin having an enlarged head 48 extending through an opening 49 in intermediate plate 39, the upper end of the head 49 being conical to provide a relatively small electrical contacting area. Each contact 46 extends through an opening 50 in the lower plate 40 and is yieldingly urged upwardly against the underside of the upper plate 38 by a spring 51 wound around the contact and extending between lower plate 40 and head 48. Contacts 47 are identical in construction to contacts 46. Electrical leads 52, 53 extend from the lower end of the contacts 46, 47 to the switching assembly 37.

An ejector mechanism is provided for the contact assembly to assist the removal of the card C from the card operated mechanism and comprises a plunger 55 having its shaft extending through a boss 56 on the upper plate 38 and an enlarged head 57 yieldingly urged against the rear of the intermediate plate 39 by a spring 58 wound around the ejector pin 55 and extending between the boss 56 and a flange on the head 57.

Referring to FIGS. 2, 6 and 14, the switching assembly comprises a plurality of manually operated switching members 60 which are adapted to be moved upwardly or downwardly as shown in FIG. 2 in order to selectively connect contact 46 in an electrical circuit. Each of the switching members 60 is identical in construction and as shown in FIGS. 2 and 14 comprises a movable contact 61 associated with each switching member 60 and adapted to be selectively engaged with one of the three contacts 62, 63, 64. The movable contact 61 includes an arcuate portion 65 which is always in contact with an electrical contact 66 of greater length than contacts 62, 63, 64 which is in turn electrically connected by the wire 52 to one of the switches 46. Contact 63 is electrically connected to one of the contacts 47. By this arrangement, regardless of the position of switching member 60, contact 61 thereon is always electrically connected to the respective contact pin 46 in the contact assembly 36 through the arcuate portion 65 and contact 66. In the neutral position as shown in FIG. 2, electrical contact 63 is engaged with the movable contact 61. In the up position, electrical contact 64 is electrically connected to the movable contact 61 and in the down position electrical contact 62 is electrically connected to the movable contact 61.

The diagrammatic wiring diagram of the card key mechanism is shown in FIG. 11 wherein, for purposes of clarity, identical reference numerals are used as in the description of the apparatus in FIGS. 2 through 10.

As shown in FIG. 11, power from a transformer 70 is provided to each of contacts 63. Similarly, power is provided to each of the contacts 62. A solenoid 71 which is to be operated for actuating the mechanism for opening the gate 20 or a door, as the case may be, is electrically connected to each of the contacts 64 and to the lead extending to the contact 63. In the switching mechanism shown, six contacts are provided. Any two may be manipulated to ready the circuit for operation by means of a card.

As shown in FIG. 4, the card C is made of thin insulating material and is provided with a conductive circuit thereon made of conductive material and comprising a lead 72 extending from one of a plurality of contacting areas 73 and a lead 74 extending from another of the contacting areas 73 connected by a connecting portion 75. Additional connecting portions may be provided on the card, these portions being broken electrically so that at first appearance the card appears to be the same throughout. Electrical insulating material such as a coating of a suitable plastic P may be provided over the connecting legs 72, 74, 75, it only being necessary to leave the areas 73 exposed so that when the card C is placed in the card key system with the areas 73 extending downwardly they may be engaged by the contacts 46. It can be appreciated if the switch operating members 60 corresponding to the contacts 46 which overlie the contacting area 73, which are designated by the letter X in FIG. 4, are electrically connected in the proper manner a circuit will be completed to the solenoid 71 providing for energization of the gate or door. For example, as shown in FIG. 11, if one of the switches is set up so that there is contact with the contact 62 and the other is arranged for contact with the contact 64 and an appropriate card bearing the proper indicia means thereon is inserted in the card operating mechanism, the solenoid 71 will be energized.

If someone attempts to open or operate the card key system without an appropriate card, for example, by inserting a knife, the contacts 47 are first encountered providing a short across the transformer 70 without energizing the solenoid 71.

As shown in FIG. 6, the switching assembly 37 may have the switching member 60 identified with numerals corresponding to the number of each switching unit, six being shown in FIG. 6. Cards may be provided corresponding to the pair of contacts 46 to be selected. As shown in FIG. 12 the cards may have various pairs of contacts electrically connected on the card. As shown in FIG. 12, the card $C_1$ has contacts 1 and 2 electrically connected so that the corresponding setting of the switching mechanism would be with switch members 60 bearing numbers one and two moved upwardly and downwardly. Card $C_2$ in FIG. 12 has contacts 1 and 4 electrically connected, card $C_3$ has contacts numbers 1 and 5, card $C_4$ has contacts numbers 1 and 6 and card $C_5$ has contacts numbers 2 and 3.

In order to enable the switching assembly to be changed without difficulty by inexperienced personnel, a table such as shown in FIG. 13 may be provided in connection with the card key system. In addition, a plurality of cards corresponding to the various combinations of settings may be supplied from time to time bearing a code number. Thus, when a card 1 is supplied corresponding to the code number 1, the card will have the circuitry thereon such that areas 73 are connected which correspond to the switches 1 and 2. By referring to the chart, it is possible to determine what the switch assembly setting should be for any particular coded card. As is apparent from the table, where six switches comprise the switching assembly, fifteen different combinations of switching can be used. It is thus possible to utilize the card key system in connection with gates or doors where from time to time the cards are changed to correspond to the payment of dues or fees.

A feature of the invention is that it is possible to overlap the operation of the card key system so that two different cards can operate the switch. In order to do this, it is only necessary to set the switching assembly for both cards. This is an advantage where in the case of dues or fees it would be desired to provide a grace period so that the users of the old cards could continue to operate the card key system and at the same time users of the news cards could operate the system. When desired, the card key system may be set so that the old cards do not operate the system merely by returning the appropriate switching members 60 to a neutral position as determined by the table.

Figure 15:
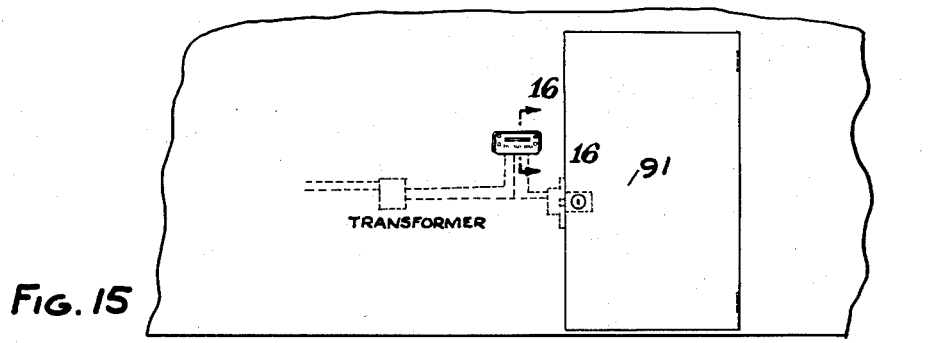
FIG. 15 is a fragmentary elevation showing a modified form of card key system used in connection with operating a door.
Figure 16:
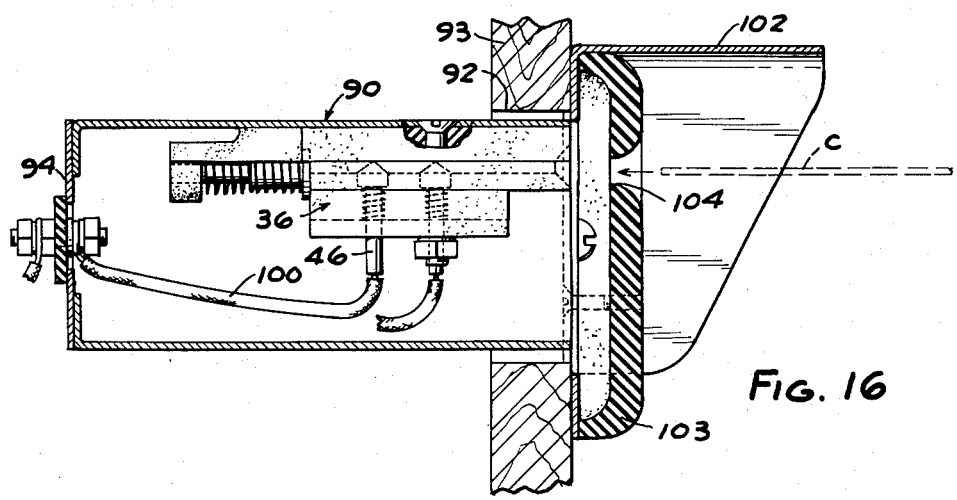
FIG. 16 is a fragmentary sectional view taken along the line 16—16 in FIG. 15.
Figure 17:
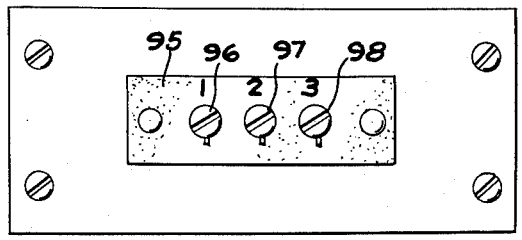
FIG. 17 is a rear elevation of the card key mechanism shown in FIG. 16.

A modified form of card receiver assembly is shown in FIGS. 15 to 17. This type of receiver assembly comprises a casing 90 and is described in connection with a door opening system wherein the insertion of the card C into the card receiver assembly completes a circuit for disengaging a door lock or door 91.

As shown in FIG. 16, casing 90 is generally rectangular and is intended to be placed in an opening 92 in a wall 93 adjacent the door 91. A contact assembly identical to contact assembly 36 is provided on the underside of the top wall of casing 90 and the rear cover 94 of the casing supports an electrical panel 95 which has three contacts 96, 97, 98. In this form of the invention, the switching is entirely eliminated and leads extend directly from a pair of contacts 46 to the terminals 97, 98, respectively. When it is desired to change the setting of the card key system, the leads 100 must be changed so that they are connected to a different pair of contacts 46.

Figure 18:
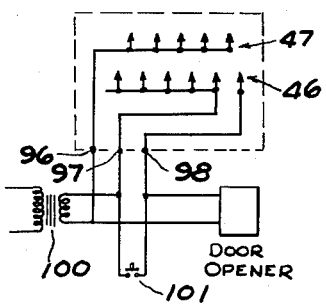
FIG. 18 is a diagrammatic wiring diagram of the modified form of card key system shown in FIGS. 15–17.

The electrical wiring diagram of the card receiver assembly shown in FIGS. 15–17 is shown in FIG. 18, corresponding reference numerals being used for purposes of clarity. As shown, the terminals 96, 97 are adapted to be connected across the secondary of a transformer 100, the terminals 97, 98 being connected in series with one line of the transformer. The transformer is adapted to energize the door opener when a circuit is completed in the secondary of the transformer. In this manner, when a card C is inserted in the card receiver assembly 90 it completes a circuit in the secondary circuit of the transformer. A push button switch 101 is provided in parallel across the terminals 97, 98 and is positioned in a convenient place on the interior so that the door lock can be disengaged when a person wishes to leave the interior. By pushing the button the door may be opened.

In this form of the invention, as in the previous form, the outer contacts 47, being disposed in a row in advance of the inner contacts 46 and staggered relative thereto, serve to short circuit the secondary of the transformer whenever an attempt is made to operate the switches by inserting a knife or the like in the switch.

As shown in FIG. 16, a protective cover 102 is provided on the exterior of the wall 93 and a card guide 103 of insulating material having an opening 104 is positioned below the shield on the front wall of the casing 90, the opening 104 being aligned with the opening of the contact assembly.

The card key system shown in FIGS. 15–18 is particularly suitable for installations where it is not necessary to make changes in the setting at too frequent intervals, such as gaining entrance to a key club or the like wherein possibly the same membership fee gains admittance for an extended period.

I claim:

1. An electrical locking system to be opened by the flat side of a flat key which comprises, a housing means having an opening at one side for receiving a flat key and a second opening at another side for manipulation of a code system for said locking means, a locking closure for said second opening, electrical circuitry within said housing means for electrical association with an opening or closing device, and means in said circuitry comprising a plurality of contacts arranged in a single plane within said housing adjacent the opening for the flat key means, code switch means within said housing connected into said circuitry, each conductively associated with one of said contact means and adapted to be selectively conditioned for inclusion in said circuitry, and a flat key means for insertion into the key opening of said housing having means on the surface thereof for selectively connecting two or more of said contact means in said circuitry through said code switch means, said circuitry and said switch means being entirely concealed and protected from the flat key opening by said housing.

2. The combination set forth in claim 1 wherein said code switches are located adjacent said second opening for manipulation therethrough.

3. An electrical locking system to be opened by the flat side of a flat key which comprises, a housing means having an opening at one side for receiving a flat key, electrical circuitry within said housing means for electrical association with an opening or closing device, and means in said circuitry comprising a plurality of contacts arranged in a single plane within said housing adjacent the opening for the flat key means, code switches within said housing connected into said circuitry, each conductively associated with one of said contact means and adapted to be selectively conditioned for inclusion in said circuitry, and a flat key means for insertion into the key opening of said housing having means on the surface thereof for selectively connecting two or more of said contact means in said circuitry through said code switch means, said circuitry and said switch means being entirely concealed and protected from the flat key opening by said housing.

4. The combination set forth in claim 3 wherein said contact means comprises a row of contacts yieldably urged into the path of said flat key and adapted to be cammed thereby.

5. The combination set forth in claim 4 including a second plurality of protective contacts provided at said opening in advance of said first contacts and electrically connected with said circuitry to short out the circuits upon insertion of a conductive plate into said opening.

6. A card key system comprising a casing, said casing having a side wall having an opening therein through which a flat card having electrically conductive means in a predetermined position thereon is adapted to be inserted, a contact assembly mounted in said casing adjacent said opening and having a slot therein into which said card is adapted to pass after being inserted into the opening in said casing, said contact assembly having a plurality of contacts therein mounted adjacent said slot and adapted to be contacted by said card for selectively connecting two or more of said contacts in an electrical circuit, and a switching assembly mounted within said casing, said switching assembly including switching means for selectively connecting certain of said contacts in said contact assembly in an actuating circuit.

7. The combination set forth in claim 6 wherein said contacts in said contact assembly comprise a plurality of pins extending into said opening and yieldingly urged in a direction at right angles to the plane of the card when it is inserted in the slot of said contact assembly.

8. The combination set forth in claim 6 wherein said switch assembly comprises a switch individual to each said contact in said contact assembly.

9. A card key system comprising a casing, said casing having a side wall having an opening therein through which a flat card having electrically conductive means in a predetermined position thereon is adapted to be inserted, a contact assembly mounted in said casing adjacent said opening and having a slot therein into which said card is adapted to pass after being inserted into the opening in said casing, said contact assembly having a plurality of contacts therein mounted adjacent said slot and adapted to be contacted by said card for selectively connecting two or more of said contacts in an electrical circuit, and a switching assembly mounted within said casing, said switching assembly including switching means for selectively connecting certain of said contacts in said contact assembly in an actuating circuit, said casing including another side wall having an opening therethrough, closure means for said opening, rail means within said casing, said switching assembly having means thereon adapted to engage with said rail means for slidably supporting said switching assembly in said casing for removal through said opening in said other side wall.

10. A card key system comprising means defining a slot into which a card having electrically conductive means in a predetermined position thereon is adapted to be inserted, a plurality of contacts positioned within said slot and adapted to engage the surface of said card when it is inserted in said slot, and means for selectively connecting certain of said contacts in a circuit with electrical actuating means whereby when said card is inserted in said slot and the electrically conductive means thereon corresponds with the location of contacts which are selectively connected a circuit is completed through said selected contacts to energize said electrical actuating means.

11. The combination set forth in claim 10 including an additional set of contacts positioned in said slot in advance of said first set and electrically connected to said actuating circuit to short circuit when a conductive member is inserted into said slot thereby preventing the completion of said circuit through said electrical actuating means.

12. The combination set forth in claim 10 wherein said means for selectively connecting certain of said contacts in said first set comprises a manually operated switch individual to each said contact for connecting and disconnecting said contact in said actuating circuit.

13. A card key system comprising means defining a slot into which a card having electrically conductive means in a predetermined position thereon is adapted to be inserted, a first set of contacts positioned in a row and yieldingly urged within said slot in a direction at right angles to the plane of the card when it is in said slot, a second set of contacts positioned in a row in advance of the first set and yieldingly urged into said slot at a right angle to the plane of said card when it is in said slot, electrical actuating means, means for selectively connecting a pair of said first set of contacts in a circuit including said electrically actuated means, said second set of contacts being connected to said circuit in such a manner that when a conductive object is inserted into said slot, said circuit is shorted preventing the actuation of said electrical actuating means, whereby when a card having electrically conductive means thereon corresponding to the location of said contacts which are selectively connected is inserted into said slot a circuit is completed to actuate said electrical actuating means.

14. The combination set forth in claim 13 wherein said means for selectively connecting a pair of said contacts in a circuit comprises a switch individual to each said contact, said switch having a manually movable contact, said contact being connected to one of said contacts in said first set, said switch including a plurality of fixed contacts, said fixed contacts being connected to said circuit for said electrical actuating means, whereby when said movable contact is moved into contact with one of said fixed contacts the movable contact in said slot is connected or disconnected in said circuit.

15. In a card key system wherein a flat card having electrically conductive means in a predetermined position thereon is inserted in a slot to operate the system, the combination comprising a body of insulating material having a slot therein into which said card is adapted to be inserted, a plurality of electrical contacts yieldingly mounted in said body and urged into said slot in the path of said card, and a second set of contacts mounted on said body and adapted to extend into said slot in advance of said first set of contacts, said second set of contacts being adapted to be electrically connected in circuitry with said first set for short circuiting said circuitry when a conductive plate is inadvertently inserted into said slot, an ejector mounted at the base of said slot and means for yieldingly urging said ejector toward the open end of said slot for ejecting said card.

16. In a card key system wherein a flat card having electrically conductive means in a predetermined position thereon is inserted in a slot to operate the system, a switching assembly for selectively connecting the contacts which are engaged by said card comprising a plurality of individual switches, each said switch comprising a movable contact which is adapted to be connected to one of the contacts in said contact assembly, and a plurality of fixed contacts, said fixed contacts being selectively engaged by said movable contact to connect a fixed contact in a circuit for the electrical actuating means.

17. The combination set forth in claim 1 wherein each said code switch means comprises a movable contact electrically connected to its respective contact means and a plurality of fixed contacts with which said movable contact may be selectively connected.

18. The combination set forth in claim 8 wherein each said switch individual to each said contact comprises a manually movable contact, said contact being connected to one of said plurality of contacts, said switch including a plurality of fixed contacts, said movable contact being selectively movable into contact with one of said fixed contacts.

19. The combination set forth in claim 12 wherein each said switch individual to each said contact comprises a manually movable contact, said contact being connected to one of said plurality of contacts, said switch including a plurality of fixed contacts, said movable contact being selectively movable into contact with one of said fixed contacts.

20. A card key system comprising means defining a slot into which a card having electrically conductive means in a predetermined position thereon is adapted to be inserted, a plurality of card contacts positioned within said slot and adapted to engage the surface of said card when it is inserted in said slot, means for selectively connecting certain of said card contacts in a circuit with an electrical actuating means comprising a pair of power lines, a switch individual to each said card contact, each said switch having a manually movable contact, said movable contact being connected to its respective card contact, each said switch including a first fixed contact which is electrically connected to one of said power lines and a second fixed contact which is electrically connected to the other of said power lines, said electrical actuating means being electrically connected with said first fixed contacts, whereby when a movable contact in one switch is moved into contact with the first fixed contact of said one switch and a movable contact of another switch is moved into contact with the second fixed contact of said other switch, a circuit for energizing the electrical actuating means is conditioned for completion by said electrically conductive means on said card.

21. A card key system comprising means defining a slot into which a card having electrically conductive means in a predetermined position thereon is adapted to be inserted, a first set of card contacts positioned in a row and yieldingly urged within said slot, a second set of card contacts positioned in a row in advance of the first set and yieldingly urged into said slot, said second set of card contacts being connected in series, means for selectively connecting a pair of said first set of card contacts in a circuit with an electrically actuating means which comprises a pair of power lines, each said selectively connecting means comprising a switch having a manually movable contact, said movable contact being connected to one of said card contacts in said first set, each said switch including a first fixed contact which is connected to one of said power lines, a second fixed contact which is connected to the other of said power lines, and a third fixed contact which is connected to said second set of card contacts, said electrical actuating means being connected in series with one of said first and second fixed contacts, said movable contact being adapted to be moved into contact with one of said first, second or third fixed contacts, whereby when a movable contact of one switch is moved into contact with the first fixed contact of said one switch and a movable contact of another switch is moved into contact with the second fixed contact of said other switch, a circuit for energizing the electrical actuating means is conditioned for completion by said electrically conductive means on said card, said second set of card contacts being adapted to short circuit said power lines and prevent energization of said electrical actuating means upon insertion of a metallic part which spans any pair of contacts of said first and second set of card contacts.

22. A card key system comprising means defining a slot into which a card having electrically conductive means in a predetermined position thereon is adapted to be inserted, a plurality of card contacts positioned within said slot and adapted to engage the surface of said card when it is inserted in said slot, means for selectively connecting certain of said card contacts in a circuit with a solenoid comprising a transformer having a primary and a secondary, a switch individual to each said card contact, each said switch having a manually movable contact, said movable contact being connected to said card contacts positioned within said slot, each said switch including a first fixed contact which is electrically connected to one point on the secondary and a second fixed contact which is electrically connected to another point on said seondary, said solenoid being connected with one set of said fixed contacts, whereby when a movable contact in one switch is moved into contact with the first fixed contact of said one switch and a movable contact of another switch is moved into contact with the second fixed contact of said other switch, a circuit for energizing the electrical actuating means is conditioned for completion by said electrically conductive means on said card.

23. A card key system comprising means defining a slot into which a card having electrically conductive means in a predetermined position thereon is adapted to be inserted, a first set of contacts positioned in a row and yieldingly urged within said slot, a second set of contacts positioned in a row in advance of the first set and yieldingly urged into said slot, said second set of contacts being in series, means for selectively connecting a pair of said first set of card contacts in a circuit with a solenoid which comprises a transformer including a primary and a secondary, each said selectively connecting means comprising a switch having a manually movable contact, said movable contact being connected to one of said card contacts in said first set, each said switch including a first fixed contact which is connected to a point on said secondary, a second fixed contact which is connected to another point on said secondary, and a third fixed contact which is connected to said second set of card contacts, said solenoid being in series with one of said first and second fixed contacts, said movable contact being adapted to be moved into contact with one of said first, second or third fixed contacts, whereby when a movable contact of one switch is moved into contact with said first fixed contact of said one switch and a movable contact of another switch is moved into contact with said second fixed contact of said other switch, a circuit for energizing the electrical actuating means is conditioned for completion by said electrically conductive means on said card, said second set of card contacts being adapted to short circuit said secondary and prevent energization of said solenoid upon insertion of a metallic part which spans said any pair of card contacts of said first and second set of card contacts.

References Cited in the file of this patent

UNITED STATES PATENTS

| | | |
|---|---|---|
| 2,105,304 | Wagner | Jan. 11, 1938 |
| 2,473,664 | Taylor | June 21, 1949 |
| 2,655,569 | St. John | Oct. 13, 1953 |
| 2,734,954 | Kidd | Feb. 14, 1956 |
| 2,864,909 | Cobb | Dec. 16, 1958 |
| 2,870,400 | Hickok | Jan. 20, 1959 |
| 2,921,152 | Simjian | Jan. 12, 1960 |
| 2,967,916 | Williams | Jan. 10, 1961 |